UNITED STATES PATENT OFFICE.

PAUL JÖRN, OF HAMBURG, GERMANY.

PROCESS OF PRESERVING HAMS.

1,036,255.

No Drawing.

Specification of Letters Patent. Patented Aug. 20, 1912.

Application filed March 12, 1912. Serial No. 683,305.

*To all whom it may concern:*

Be it known that I, PAUL JÖRN, a citizen of Germany, and resident of No. 101 Lübeckerstrasse, Hamburg, in the Empire of Germany, have invented a new and useful Process of Preserving Hams, of which the following is a specification.

In the treatment and preservation of hams, it is necessary to keep the hams tightly incased during cooking and processing, as well as during cooling. More particularly is it necessary to employ an elastic casing or can, so that during the expansion of the ham while being cooked the casing will expand with it and an undue expression of fat and meat juice, caused by excessive pressure, will be prevented, and during the subsequent cooling and consequent contraction or shrinking of the ham the can will correspondingly collapse and a loosening of the ham in the casing will be obviated.

According to the present invention, the hams, salted and boned in the ordinary manner, are each inserted, without being previously pressed and cooked and without any additional substance, such as water or gravy, in a flat tin or envelop which has substantially the same shape as the ham, the cubical capacity of the said tin exceeding the volume of the ham by approximately 10 per cent, so as to allow for the expansion of the ham during its subsequent cooking. The cover is then hermetically secured to the tin, leaving the interior of the tin open to the atmosphere only through a vent hole in the cover or, preferably, in one of the side walls of the tin near the narrower end of the latter. The tin containing the ham is then placed in a vacuum chamber wherein the air is exhausted from the inside of the tin by way of the vent hole, and while the tin is still *in vacuo* the vent hole is hermetically sealed. The walls of the tin are so weak that when the vacuum chamber is opened, the inrushing air acting externally on the tin causes the said walls to collapse until they tightly fit and closely incase the ham. The difference between the cubic capacity of the tin in its original form and the volume of its contents is thus practically neutralized, after the exhaustion of the air from the tin, by the collapse or bending inward of the walls under the atmospheric pressure bearing externally thereon. After the aforesaid exhaustion of the air from, and the hermetic closure of, the tin, which latter, as before described, has collapsed around and against the ham inclosed therein, the said tin is inserted into a boiling vessel wherein it is processed in the usual manner until the ham is completely cooked and sterilized. During this cooking process the ham expands and forces the collapsed walls of the tin into their original form, the said walls being free and weak enough to yield under the pressure of the expanding ham without risk of bursting. While this part of the process is being carried out the ham is continuously under pressure, so that an injurious expansion of the ham is prevented. By the elastic incasement of the ham every undue expression of fat and meat juice is avoided, and, moreover, a compact shape is secured for the ham, and the cavities produced by the removal of the bones are closed up, so that the ham appears as one homogeneous mass of meat.

After the completion of the cooking and processing, and during the subsequent cooling, the walls of the hermetically sealed tin again collapse in correspondence with the shrinkage or reduction in size of the ham which naturally takes place while the latter is cooling, the ham being thus kept tightly incased under pressure during cooking and processing, as well as during cooling and after the cooling process is completed.

The invention besides being applicable to the treatment and preservation of hams, as hereinbefore described, is also applicable to the treatment and preservation of other joints or sections of meat and for that reason it is to be understood that wherever, in this specification and the following claims, the context admits of it the word "ham" is to be read as including such other joints or sections of meat.

It has hereinbefore been mentioned that the vent hole is preferably formed in one of the side walls of the tin near the narrower end thereof; the reason for this preferred locale of the said vent hole is that the leg end of the ham contained within the narrower end of the tin does not lie close to the wall of the latter and, therefore, has little or no tendency to be drawn by suction against and, therefore, prematurely close to the vent hole.

I claim as my invention:

1. The improvement in the art of preserving or canning hams consisting in inserting the ordinarily salted and boned ham without being previously pressed and cooked and without any additional liquid, in a vented flat tin which conforms substantially to the shape of the ham, the cubical capacity of the said tin exceeding the volume of the ham by approximately 10 per cent., hermetically sealing a cover to the tin, exhausting the air from the interior of the tin through the vent hole and subsequently sealing the said vent hole, whereby the walls of the tin are caused to collapse against the ham under external atmospheric pressure, processing the tin to cook and sterilize its contents, during which operation the expansion of the ham restores the walls of the tin to their original form, and finally cooling the tin and its contents, whereby the said walls are again caused to collapse in accordance with the shrinkage of the said contents.

2. The improvement in the art of preserving or canning hams consisting in inserting the ordinarily salted and boned ham without being previously pressed and cooked and without any additional liquid in a flat tin which conforms substantially to the shape of the ham and has a vent hole in one of its side walls near its narrower end, hermetically sealing a cover to the tin, exhausting the air from the interior of the tin through the vent hole, sealing the said vent hole, processing the tin to cook and sterilize its contents, and finally cooling the tin and its contents, the walls of the sealed tin collapsing around and against the ham when exposed to unbalanced atmospheric pressure, expanding with the expansion of the ham during the cooking process, and again collapsing around and against the ham during the cooling of the latter.

3. In the process of preserving or canning meat, inserting the meat in an unpressed and uncooked condition in a vented can whose cubical capacity exceeds the volume of the meat by approximately 10 per cent., the walls of the can being sufficiently weak to collapse under unbalanced external pressure and to expand under the pressure of the expanding meat when cooked in the said can, exhausting the air from the can through the vent in the latter, hermetically sealing the vent, and subsequently processing the can to cook and sterilize the meat while hermetically inclosed within the can.

In witness whereof I have hereunto signed my name this 26th day of February 1912, in the presence of two subscribing witnesses.

PAUL JÖRN.

Witnesses:
ERNEST H. L. MUMMENHOFF,
IDA CHRIST. HAFERMANN.